(12) United States Patent
Wang et al.

(10) Patent No.: US 12,209,680 B2
(45) Date of Patent: Jan. 28, 2025

(54) DRIVE DEVICE, CONTROL VALVE, AND METHOD FOR FABRICATING DRIVE DEVICE

(71) Applicant: ZHEJIANG SANHUA AUTOMOTIVE COMPONENTS CO., LTD., Zhejiang (CN)

(72) Inventors: Lixin Wang, Zhejiang (CN); Yun Wang, Zhejiang (CN); Long Lin, Zhejiang (CN); Jianhua Chi, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 0 days.

(21) Appl. No.: 18/272,867

(22) PCT Filed: Jan. 18, 2022

(86) PCT No.: PCT/CN2022/072435
§ 371 (c)(1),
(2) Date: Jul. 18, 2023

(87) PCT Pub. No.: WO2022/152306
PCT Pub. Date: Jul. 21, 2022

(65) Prior Publication Data
US 2024/0084913 A1    Mar. 14, 2024

(30) Foreign Application Priority Data

Jan. 18, 2021 (CN) .......................... 202110064095.3
Feb. 1, 2021 (CN) .......................... 202110138021.X

(51) Int. Cl.
*F16K 31/04* (2006.01)

(52) U.S. Cl.
CPC .................................. *F16K 31/04* (2013.01)

(58) Field of Classification Search
CPC ....................................................... F16K 31/04
See application file for complete search history.

(56) References Cited

U.S. PATENT DOCUMENTS

| 4,158,483 A * | 6/1979 | Fisher | B60R 1/072 |
| | | | 359/876 |
| 10,240,663 B2 * | 3/2019 | Nickel | B60N 2/919 |

(Continued)

FOREIGN PATENT DOCUMENTS

| CN | 101806332 A | 8/2010 |
| CN | 108331960 A | 7/2018 |

(Continued)

OTHER PUBLICATIONS

International Search Report for PCT/CN2022/072435 mailed Apr. 13, 2022, ISA/CN.

(Continued)

*Primary Examiner* — Eric Keasel
(74) *Attorney, Agent, or Firm* — Yue (Robert) Xu; Apex Attorneys at Law, LLP

(57) ABSTRACT

A drive device includes a housing, a motor and a transmission assembly; the housing includes a first casing and a second casing; the first casing includes a first protruding portion and a second protruding portion; the second casing includes a third protruding portion; the transmission assembly includes a first-stage worm, a second-stage worm and a transmission wheel; the first-stage worm includes a first tooth-shaped portion; the second-stage worm includes a second tooth-shaped portion; the first protruding portion and the second protruding portion both limitedly cooperate with the second-stage worm; along the axial direction of the second tooth-shaped portion, the first protruding portion is located on one side of the second tooth-shaped portion; the second protruding portion is located on the other side of the (Continued)

second tooth-shaped portion; and the distance between the third protruding portion and the transmission wheel is within a preset range.

20 Claims, 9 Drawing Sheets

(56) References Cited

U.S. PATENT DOCUMENTS

| | | | |
|---|---|---|---|
| 10,479,399 B2 * | 11/2019 | Beyerlein | B62D 15/025 |
| 10,537,992 B2 * | 1/2020 | Yun | B25J 9/1025 |
| 10,780,798 B2 * | 9/2020 | Falster | B60N 2/0284 |

FOREIGN PATENT DOCUMENTS

| | | |
|---|---|---|
| CN | 108591445 A | 9/2018 |
| CN | 111219492 A | 6/2020 |
| CN | 112212055 A | 1/2021 |
| JP | 2016109266 A | 6/2016 |
| JP | 2017003033 A | 1/2017 |
| JP | 2020008173 A | 1/2020 |

OTHER PUBLICATIONS

The Japanese 1st Office Action mailed on Jun. 4, 2024 for JP2023-543213.
The European search report mailed on Nov. 14, 2024 for EP22739181.0.

* cited by examiner

DRIVE DEVICE, CONTROL VALVE, AND METHOD FOR FABRICATING DRIVE DEVICE

This application is a National Phase entry of PCT Application No. PCT/CN2022/072435, filed on Jan. 18, 2022, which claims the benefit of priorities to the following two Chinese patent applications, which are incorporated herein by reference,
1) Chinese Patent Application No. 202110064095.3, titled "DRIVE DEVICE AND CONTROL VALVE", filed with the China National Intellectual Property Administration on Jan. 18, 2021; and
2) Chinese Patent Application No. 202110138021.X, titled "DRIVE DEVICE AND CONTROL VALVE", filed with the China National Intellectual Property Administration on Feb. 1, 2021.

FIELD

The present application relates to the technical field of fluid control, in particular to a drive device, a control member and a method for manufacturing a drive device.

BACKGROUND

A drive device is widely used in various devices that need to be driven (such as a fluid control valve, etc.). The drive device includes a motor and a transmission assembly. The structure of the transmission assembly may affect the drive performance of the drive device. Therefore, new requirements are put forward for the drive device so as to ensure the drive device to stably drive a valve core of a control valve to rotate.

SUMMARY

A drive device, a control valve and a method for manufacturing a drive device are provided according to the present application, which can stably drive a valve core of the control valve to rotate.

In one aspect, a drive device is provided according to an embodiment of the present application, which includes a housing, a motor and a transmission assembly, and an accommodating cavity is defined in the housing, at least part of the transmission assembly and the motor are located in the accommodating cavity, and the housing includes a first housing and a second housing, the first housing includes a bottom wall, the second housing includes a top wall, the bottom wall and the top wall are arranged oppositely, the transmission assembly includes a first-stage worm, a second-stage worm and a transmission gear, the first-stage worm is in transmission connection with an output shaft of the motor, the second-stage worm is in transmission connection with the first-stage worm through the transmission gear, and an orthographic projection of an axis of the first-stage worm on the bottom wall intersects with an orthographic projection of an axis of the second-stage worm on the bottom wall;
the first-stage worm includes a first toothed portion, the second-stage worm includes a second toothed portion, the first toothed portion and the transmission gear form a transmission mesh structure, and the second toothed portion is located on one side, away from the first toothed portion, of the second-stage worm;
the first housing further includes a first protruding portion and a second protruding portion, the first protruding portion and the second protruding portion are fixedly connected with the bottom wall and are located in the accommodating cavity, the first protruding portion and the second protruding portion are in a position-limiting cooperation with the second-stage worm; along an axial direction of the second toothed portion, the first protruding portion is located on one side of the second toothed portion, and the second protruding portion is located on another side of the second toothed portion;
the second housing further includes a third protruding portion, the third protruding portion extends from the top wall toward the accommodating cavity; along an axial direction of the second-stage worm, the third protruding portion is arranged close to the transmission gear, and a distance between the third protruding portion and the transmission gear is within a preset range.

In another aspect, a control valve is further provided according to an embodiment of the present application, which includes a valve core and the drive device according to any one of the above embodiments, the transmission assembly of the drive device further includes an output gear, the valve core includes an input shaft section, and the input shaft section is in a transmission cooperation with the output gear, so that the input shaft section and the output gear rotate synchronously.

In another aspect, a method for manufacturing a drive device is further provided according to an embodiment of the present application, the drive device is the drive device according to any one of the above embodiments, the drive device further includes a magnetic element, and the method includes:
providing the magnetic element and the motor, wherein the motor comprises the output shaft;
putting the magnetic element and the output shaft of the motor into an injection mold of the first-stage worm, to inject the output shaft of the motor, the first-stage worm and the magnetic element into an integral structure; and
magnetizing the magnetic element.

According to the drive device, the control valve and the method for manufacturing the drive device, the transmission assembly of the drive device includes the first-stage worm and the second-stage worm, the first-stage worm is in a transmission connection with the output shaft of the motor, and the second-stage worm is in a transmission connection with the first-stage worm. Compared with only providing one stage worm, in a case that the transmission assembly achieves the same output torque and has the same transmission ratio, the drive device according to the embodiments of the present application has a smaller size by providing two stage worm drive, so that the structure of the drive device is compact. Further, the first housing of the drive device includes the first protruding portion and the second protruding portion, and the first protruding portion and the second protruding portion are arranged on two sides of the second toothed portion of the second-stage worm, so as to support and limit the second-stage worm. The second housing includes the third protruding portion, the third protruding portion is arranged close to the transmission gear, and the distance between the third protruding portion and the transmission gear is within the preset range, which can limit the movement along the radial direction of the worm caused by the meshing operation of the transmission gear and the first-stage worm, so that the drive device can stably drive the valve core of the control valve to rotate and improve the drive performance of the drive device.

DETAILED DESCRIPTION OF THE EMBODIMENTS

The features and exemplary embodiments of various aspects of the present application are described in detail below. To make the objects, solutions and advantages of the present application more clear and apparent, the present application is described in detail in conjunction with the drawings and the specifically embodiments.

As shown in FIG. 1 to FIG. 9, a drive device 1000 is provided according to an embodiment of the present application, which can be used in a control valve to drive a valve core of the control valve to rotate, thereby realizing the control of the fluid by the control valve. The drive device 1000 according to an embodiment of the present application includes a housing, a motor 30 and a transmission assembly. An accommodating cavity 101 is defined in the housing, and at least part of the transmission assembly and the motor 30 are located in the accommodating cavity 101. The motor 30 is used to provide power, and the transmission assembly can transmit the power of the motor 30 to drive the valve core to rotate.

Figure 1:
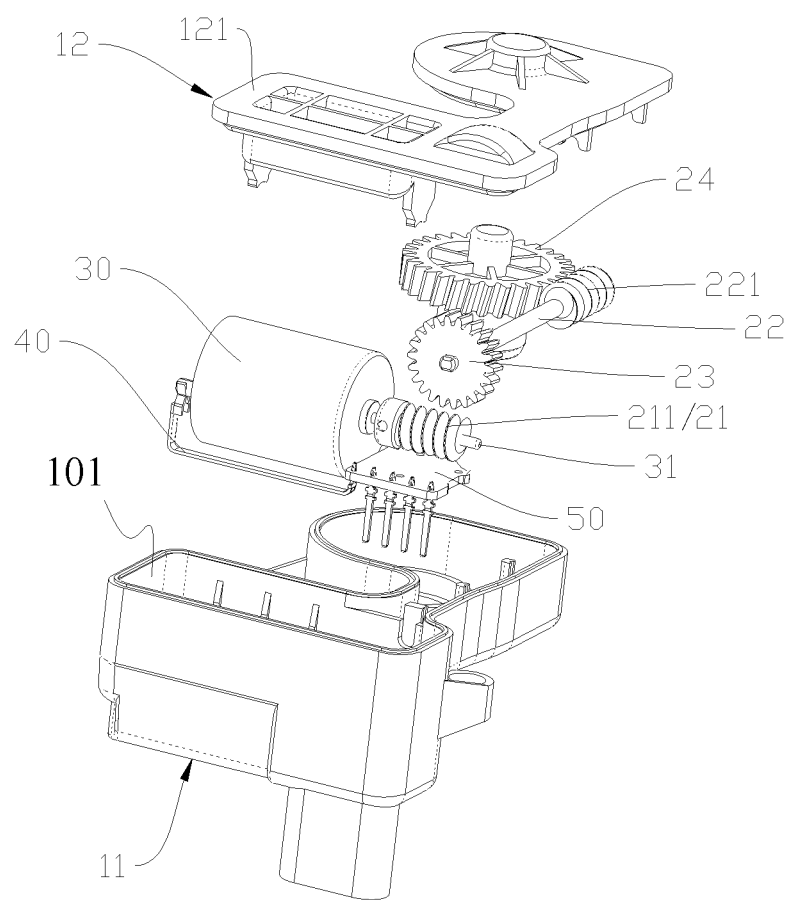
FIG. 1 is a schematic exploded view of a drive device according to an embodiment of the present application.

In this embodiment, the housing includes a first housing 11 and a second housing 12, the first housing 11 includes a bottom wall 111, the second housing 12 includes a top wall 121, the bottom wall 111 and the top wall 121 are arranged oppositely, and the transmission assembly and the motor 30 are located between the bottom wall 111 and the top wall 121. The transmission assembly includes a first-stage worm 21, a second-stage worm 22 and a transmission gear 23, the first-stage worm 21 is in a transmission connection with an output shaft 32 of the motor 30, the second-stage worm 22 is in a transmission connection with the first-stage worm 21 through the transmission gear 23, and an axial direction of the first-stage worm 21 intersects with an axial direction of the second-stage worm 22, that is, an orthographic projection of an axis of the first-stage worm 21 on the bottom wall 111 intersects with an orthographic projection of an axis of the second-stage worm 22 on the bottom wall 111. As shown in FIG. 1, in the embodiment of the present application, the axial direction of the first-stage worm 21 is perpendicular to the axial direction of the second-stage worm 22. The transmission gear 23 may be integrally molded with the second-stage worm 22 or in an interference fit with the second-stage worm 22, so as to facilitate the synchronous rotation of the transmission gear 23 and the second-stage worm 22. The first-stage worm 21 includes a first toothed portion 211, the second-stage worm 22 includes a second toothed portion 221, and the first toothed portion 211 and the transmission gear 23 form a transmission mesh structure. The second toothed portion 221 is located on one side, away from the first toothed portion 211, of the transmission gear 23, and the second toothed portion 221 may be located on one end, away from the first toothed portion 211, of the second-stage worm 22. The transmission assembly further includes an output gear 24, and the output gear 24 and the second toothed portion 221 form a transmission mesh structure. Herein, the transmission connection between the first component and the second component means that power can be transmitted between the first component and the second component, and the first component and the second component can be directly connected or connected through other transmission member.

In order to realize the stable arrangement of the second-stage worm 22, the first housing 11 further includes a first protruding portion 112 and a second protruding portion 113, both the first protruding portion 112 and the second protruding portion 113 extend from the bottom wall 111 toward the accommodating cavity 101, and the first protruding portion 112 and the second protruding portion 113 are in a position-limiting cooperation with the second-stage worm 22. Along an axial direction of the second toothed portion 221, the first protruding portion 112 is located on one side of the second toothed portion 221, and the second protruding portion 113 is located on another side of the second toothed portion 221. The first protruding portion 112 and the second protruding portion 113 are provided, and the first protruding portion 112 and the second protruding portion 113 are respectively arranged on two sides of the second toothed portion 221 of the second-stage worm 22, so as to support and limit the second-stage worm 22, thus reduce the axial shafting of the second-stage worm 22. Further, the second housing 12 further includes a third protruding portion 122, and the third protruding portion 122 extends from the top wall 121 toward the accommodating cavity 101. Along an axial direction of the second-stage worm 22, the third protruding portion 122 is located between the second toothed portion 221 and the transmission gear 23 and the third protruding portion 122 is arranged close to the transmission gear 23, the third protruding portion 122 is in a position-limiting cooperation with the second-stage worm 22, and a distance between the third protruding portion 122 and the transmission gear 23 is within a preset range. In a case that the transmission gear 23 and the first toothed portion 211 of the first-stage worm 21 are helical teeth, a vertical force (a radial direction of the first-stage worm 21) is generated during the meshing operation between the transmission gear 23 and the first toothed portion 211, which is easy to cause the transmission gear 23 to move. According to the embodiment of the present application, the third protruding portion 122 is arranged close to the transmission gear 23, the third protruding portion 122 is in a position-limiting cooperation with the second-stage worm 22, and the distance between the third protruding portion 122 and the transmission gear 23 is within the preset range, so that the movement along the radial direction of the first-stage worm 21 during the operation of the transmission gear 23 and the first-stage worm 21 can be limited. The distance between the third protruding portion 122 and the transmission gear 23 can be set according to the needs of the user, as long as the movement of the transmission gear 23 toward the top wall 121 can be limited. In some embodiments, the drive device 1000 according to the embodiment of the present application can be provided with three or more stages of worm drive. In a case that three or more stages of worm drive are provided, corresponding protruding portions can be provided to limit the worms. Herein, two-stage worm drive is taken as an example for description.

Figure 10:
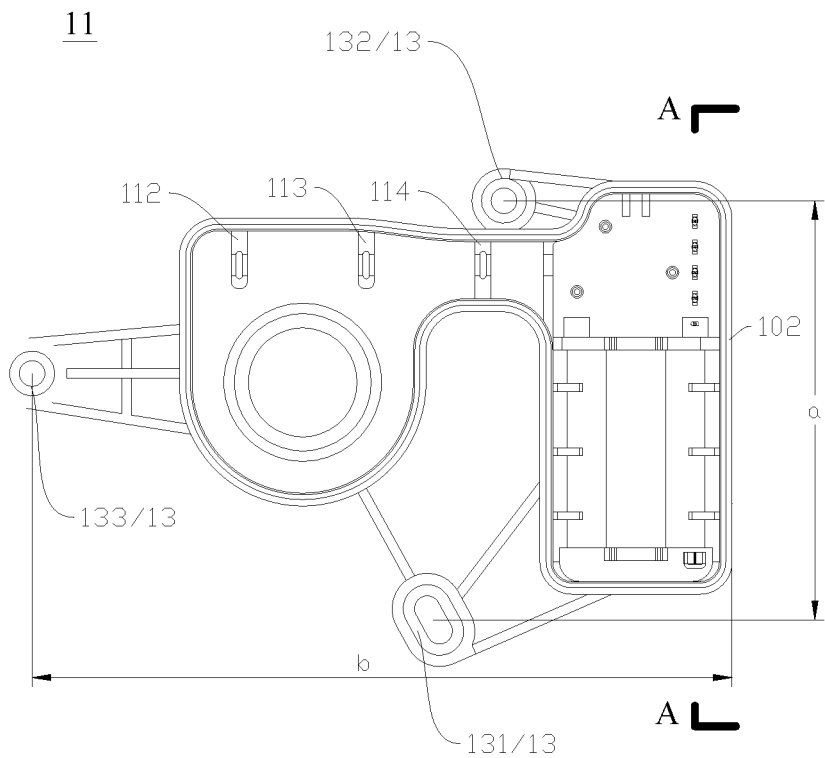
FIG. 10 is a schematic top view of the first housing according to the embodiment of the present application.

As shown in FIG. 10, in some embodiments, the drive device 1000 further includes at least three mounting portions 13 which are located on an outer circumferential side of the housing, so as to realize the stable mounting of the drive device 1000. The at least three mounting portions 13 and the housing are integrally formed, an area of a rectangular region defined by the at least three mounting portions 13 and an outer surface of the housing is less than or equal to 9230 square millimeters, a transmission ratio of the transmission assembly is greater than or equal to 620 and less than or equal to 700, and an output torque of the transmission assembly ranges from 3 N·m to 7 N·m. By providing two-stage worm drive, on the basis of achieving transmission ratio and output torque, the output gear and the transmission gear are mounted in a defined region of the mounting portions 13, which is convenient to realize the compact structure of the drive device 1000.

Figure 2:
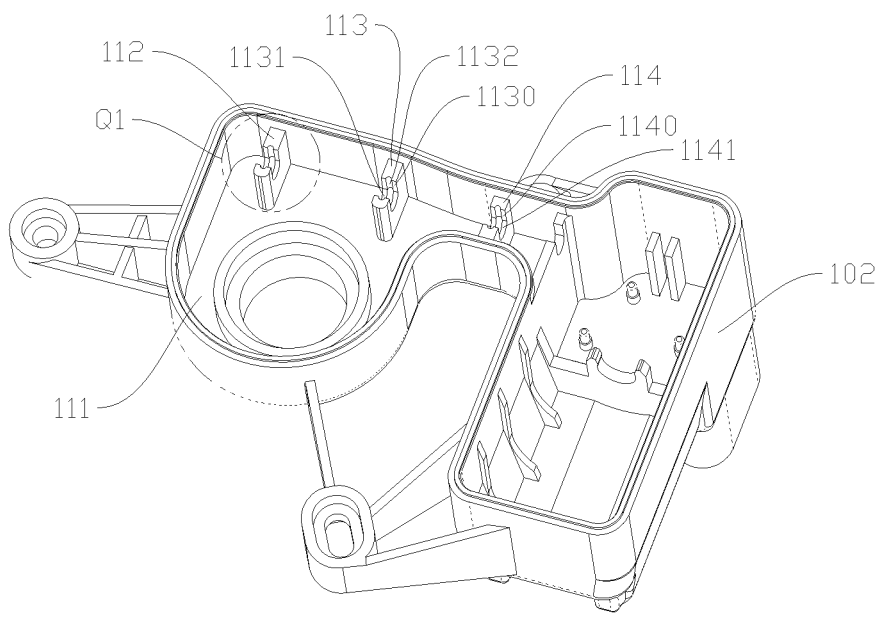
FIG. 2 is a schematic perspective view of a first housing according to the embodiment of the present application.

On this basis, as shown in FIG. 1, FIG. 2 and FIG. 10, the drive device 1000 includes a first mounting portion 131, a second mounting portion 132 and a third mounting portion 133 which are located on the outer circumferential side of the housing, the first mounting portion 131 and the second mounting portion 132 are located on two radial sides of the second-stage worm 22, and the third mounting portion 133 is located on one side, away from the first-stage worm 21, of the second-stage worm 22. The housing includes a first side wall 102, the first side wall 102 is located on one side of the housing, and the first-stage worm 21 and the second-stage worm 22 are located between the first side wall 102 and the third mounting portion 133 along the axial direction of the second-stage worm 22. A center distance a between a mounting hole of the first mounting portion 131 and a mounting hole of the second mounting portion 132 is less than 79 mm along as radial direction of the second-stage worm 22, and a distance b between a mounting hole of the third mounting portion 133 and an outer surface of the first side wall 102 is less than 117 mm along the axial direction of the second-stage worm 22.

Referring to FIG. 1 to FIG. 7, in some embodiments, the second-stage worm 22 includes a first cylindrical portion 222 and a second cylindrical portion 223, the second toothed portion 221 is located between the first cylindrical portion 222 and the second cylindrical portion 223, and at least part of the second cylindrical portion 223 is located between the second toothed portion 221 and the transmission gear 23. The first protruding portion 112 includes a first groove portion 1120, the second protruding portion 113 includes a second groove portion 1130, and the third protruding portion 122 includes a third groove portion 1220. At least part of the first cylindrical portion 222 is located in a groove cavity of the first groove portion 1120, and the first cylindrical portion 222 is in a clearance fit with the first groove portion 1120. The second cylindrical portion 223 a first sub-portion and a second sub-portion which are arranged axially, the first sub-portion is located between the second toothed portion 221 and the second sub-portion, at least part of the first sub-portion is located in a groove cavity of the second groove portion 1130, and the first sub-portion is in a clearance fit with the second groove portion 1130. At least part of the second sub-portion is located in a groove portion of the third groove portion 1220, and the second sub-portion is in a clearance fit with the third groove portion 1220. With the above arrangement, the first protruding portion 112, the second protruding portion 113 and the third protruding portion 122 cooperate with each other to support and limit the second-stage worm 22, so that the second-stage worm 22 rotates stably, thus reducing the noise during the rotation of the second-stage worm 22.

Figure 3:
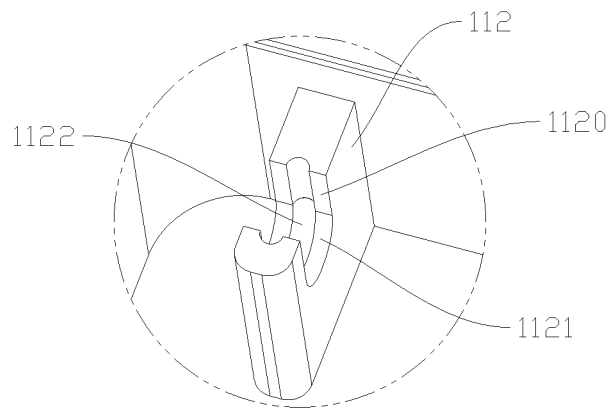
FIG. 3 is a schematic enlarged view of Q1 portion in FIG. 2.
Figure 5:
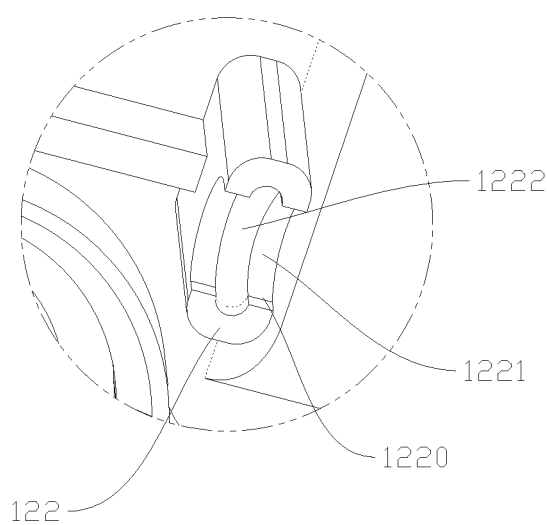
FIG. 5 is a schematic enlarged view of Q2 portion in FIG. 4.

As shown in FIG. 2, FIG. 3 and FIG. 5, in order to realize the stable rotation of the second-stage worm 22, in some embodiments, the first groove portion 1120 includes a first abutting portion 1121 and a first oil groove 1122, the first cylindrical portion 222 abuts against the first abutting portion 1121, the first oil groove 1122 is recessed from part of a wall portion of the first abutting portion 1121, and the first oil groove 1122 is located at part of an outer circumferential side of the first cylindrical portion 222; and/or, the second groove portion 1130 includes a second abutting portion 1131 and a second oil groove 1132, the first sub-portion abuts against the second abutting portion 1131, the second oil groove 1132 is recessed from part of a wall portion of the second abutting portion 1131, and the second oil groove 1132 is located at part of an outer circumferential side of the first sub-portion; and/or, the third groove portion 1220 includes a third abutting portion 1221 and a third oil groove 1222, the second sub-portion abuts against the third abutting portion 1221, the third oil groove 1222 is recessed from part of a wall portion of the third abutting portion 1221, and the third oil groove 1222 is located at part of an outer circumferential side of the second sub-portion. With the above arrangement, the second-stage worm 22 can have an excellent lubrication effect, which reduces the friction between the second-stage worm 22 and the protruding portions. In an embodiment, the first groove portion 1120, the second groove portion 1130 and the third groove portion 1220 are respectively provided with corresponding oil grooves, so as to fully lubricate the second-stage worm 22.

In some embodiments, an axial length of second-stage worm 22 is larger than an axial length of the first-stage worm 21, and the axial length of the second-stage worm 22 is greater than or equal to 550 mm and less than or equal to 650 mm. Since the length of the second-stage worm 22 is relatively long, the strength of the second-stage worm 22 is arranged to be larger than the strength of the first-stage worm 21. Specifically, the first-stage worm 21 is made of plastic, and the second-stage worm 22 is made of metal. In an embodiment, the transmission gear 23 is made of plastic. By arranging the second-stage worm 22 to be made of metal, the second-stage worm 22 can be prevented from being broken due to long length when large torque is transmitted. In addition, by arranging the first-stage worm 22 to be made of plastic, the mass of the drive device 1000 can be better limited. It can be understood that the second-stage worm 22 can be made of high-strength plastic, as long as the strength of the second-stage worm 22 can be improved, and the material of the second-stage worm 22 is not limited herein.

Figure 6:
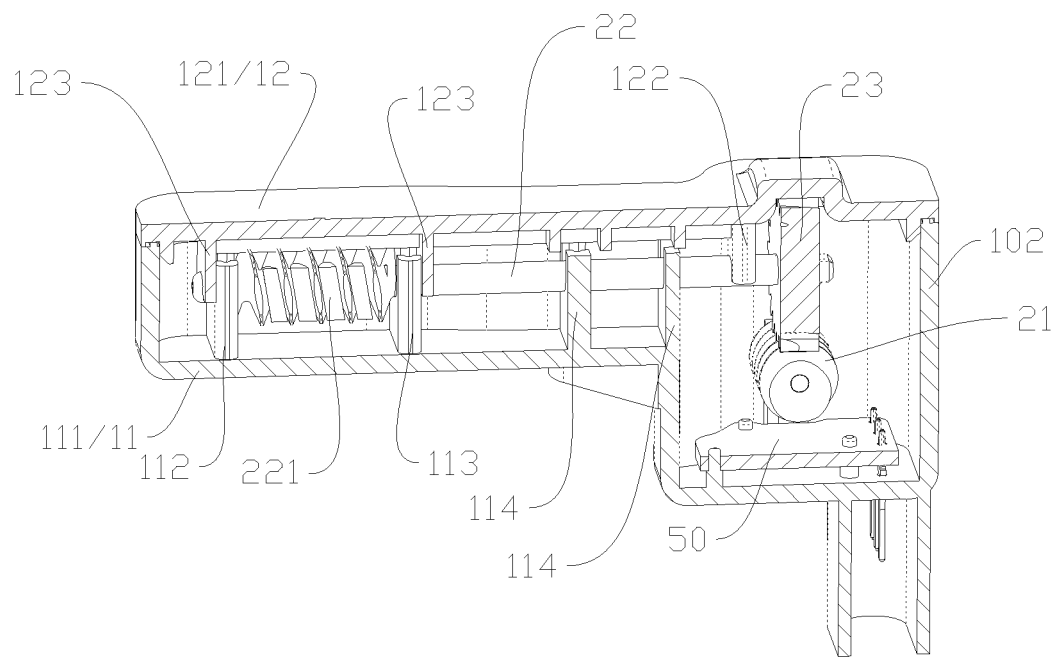
FIG. 6 is a schematic cross-sectional view of the drive device according to the embodiment of the present application.
Figure 7:
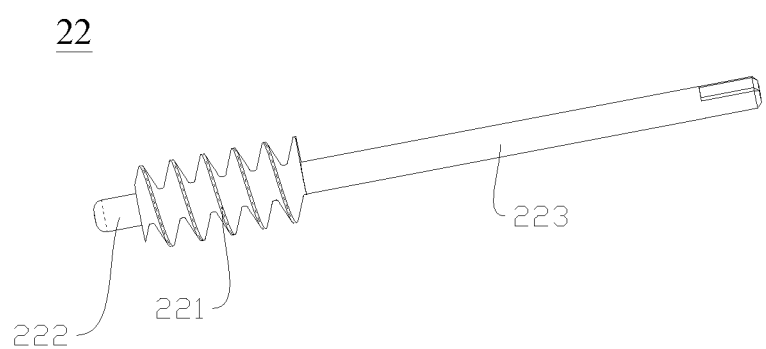
FIG. 7 is schematic a perspective view of a second-stage worm according to the embodiment of the present application.
Figure 8:
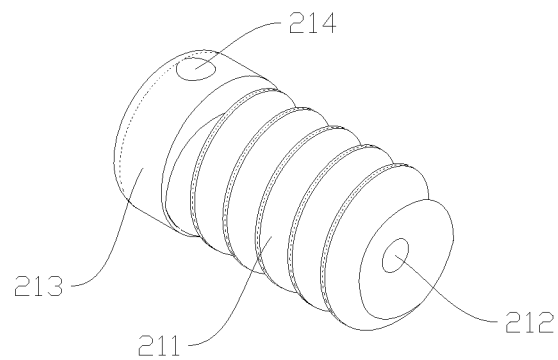
FIG. 8 is a schematic a perspective view of a first-stage worm according to the embodiment of the present application.
Figure 9:
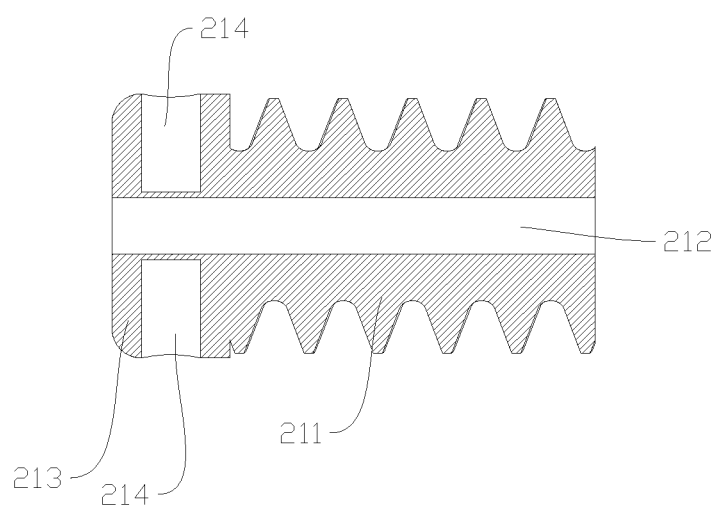
FIG. 9 is a schematic cross-sectional view of the first-stage worm shown in FIG. 8.

Since the axial length of the second-stage worm 22 is relatively long, in order to better support and limit the second-stage worm 22, as shown in FIG. 2 and FIG. 6, in some embodiments, the first housing 11 further includes at least one fourth protruding portion 114, the fourth protruding portion 114 extends from the bottom wall 111 toward the accommodating cavity 101, and at least part of the fourth protruding portion 114 is located between the second protruding portion 113 and the third protruding portion 122 along the axial direction of the second-stage worm 22. The fourth protruding portion 114 includes a fourth groove portion 1140, the fourth groove portion 1140 includes a fourth abutting portion 1141, part of the second cylindrical portion 223 is located in a groove cavity of the fourth groove portion 1140 and is in a clearance fit with the fourth groove portion 1140, and the second cylindrical portion 223 abuts against the fourth abutting portion 1141. The structure of part of the fourth protruding portion 114 may be similar to the first protruding portion 112 and the second protruding portion 113, and a fourth oil groove may be defined in the fourth groove portion 1140, so as to lubricate the middle position of the second-stage worm 22. In an embodiment, the oil groove may not be defined in the fourth protruding portion 114, so that the fourth protruding portion 114 can play a better supporting and limiting role and prevent the deformation of the second-stage worm 22 due to the long length. One, two, three or more protruding portions 114 can be provided.

Figure 4:
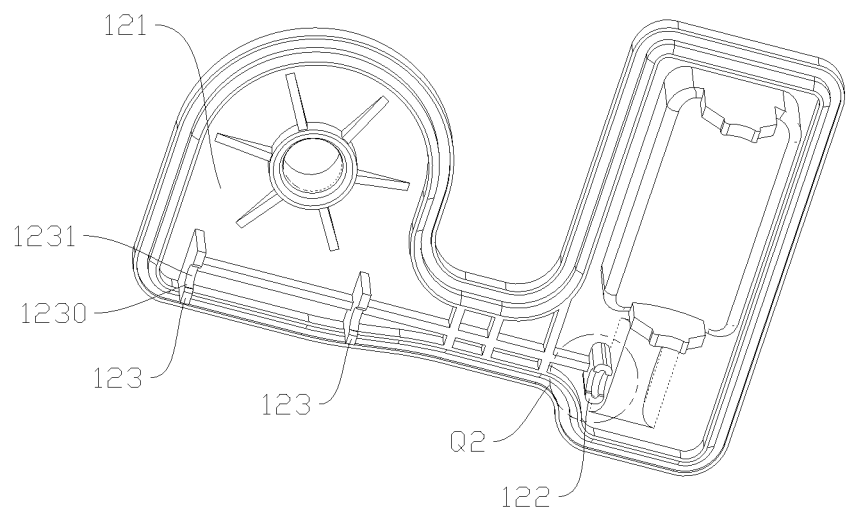
FIG. 4 is a schematic perspective view of a second housing according to the embodiment of the present application.

In order to prevent the second-stage worm 22 from generating radial shifting during movement, that is, vertical shifting, as shown in FIG. 4 and FIG. 6, the second housing 12 includes at least one fifth protruding portion 123, the fifth protruding portion 123 includes a fifth groove portion 1230, the fifth groove portion 1230 includes a fifth abutting portion 1231, part of the second-stage worm 22 is located in a groove cavity of the fifth groove portion 1230 and abuts against the fifth abutting portion 1231, and the fifth protruding portion 123 is arranged adjacent to at least one of the first protruding portion 112, the second protruding portion 113 and the fourth protruding portion 114, so as to limit the movement of the second-stage worm 22 along a direction perpendicular to the bottom wall 111. In some embodiments, as shown in FIG. 6, the second housing 12 includes two fifth protruding portions 123 which are spaced apart along the axial direction of the second-stage worm 22, and the first protruding portion 112 and the second protruding portion 113 are located between the two fifth protruding portions 123, so that the first protruding portion 112, the second protruding portion 113, and the fifth protruding portions 123 cooperate with each other, so as to prevent the second-stage worm 22 from generating vertical shifting.

Figure 11:
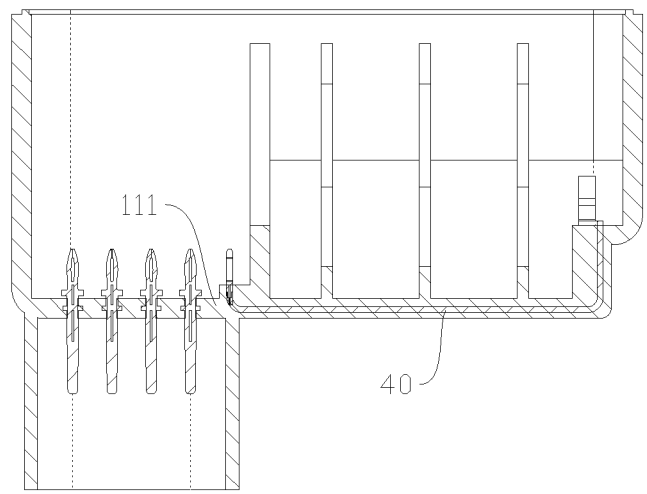
FIG. 11 is a cross-sectional view taken along line A-A in FIG. 10.
Figure 12:
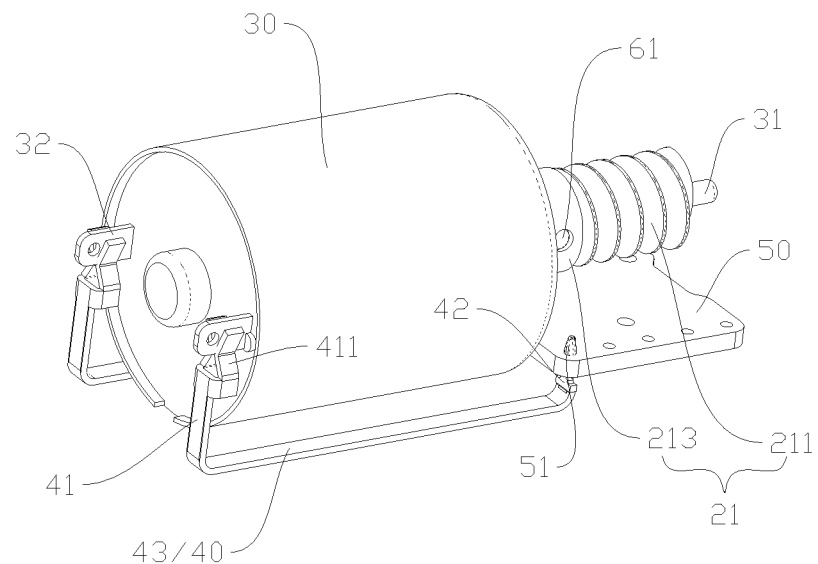
FIG. 12 is a partially schematic structural view of the drive device according to the embodiment of the present application.

As shown in FIG. 1, FIG. 11 and FIG. 12, in some embodiments, the drive device 1000 further includes a conductive member 40 and a conductive member 50, and the motor 30 includes power supply terminals 32 which are exposed to an outer surface of the motor 31. The control member 50 includes power supply control terminals 51, the power supply terminal 32 is electrically connected with the power supply control terminal 51 through the conductive member 40, and part of the conductive member 40 is buried in the bottom wall 111. The conductive member 40 includes first electrical connection portions 41 and second electrical connection portions 41 which are electrically connected with each other, and the first electrical connection portions 41 and the second electrical connection portions 42 are rigid conductive portions. The power supply terminal 32 is welded to the first electrical connection portion 41, or the power supply terminal 32 is in a snap-fit connection with the first electrical connection portion 41. The power supply control terminal 51 is welded to the second electrical connection portion 42, or the power supply control terminal 51 is in a snap-fit connection with the second electrical connection portion 42. The above arrangement facilitates the automatic assembly of the first electrical connection portion 41 and the power supply terminal 32 of the motor 30, and the automatic assembly of the second electrical connection portion 42 and the power supply control terminal 51 of the control member 50. The conductive member 40 may be a flexible lead wire, which is not limited herein.

In the specific implementation, the first electrical connection portion 41 is arranged close to the power supply terminal 32, and a distance between the first electrical connection portion 41 and the power supply terminal 32 is within a first preset range. At this time, the first electrical connection portion 41 is arranged close to the power supply terminal 32, and the distance between the first electrical connection portion 41 and the power supply terminal 32 is small, which can facilitate the automatic assembly of the first electrical connection portion 41 and the power supply terminal 32 and facilitate the electrical connection of the first electrical connection portion 41 and the power supply terminal 32 through soldering tin or snap-fit. It should be noted that the distance between the first electrical connection portion 41 and the power supply terminal 32 is within the first preset range, which means that the distance between the first electrical connection portion 41 and the power supply terminal 32 is less than or equal to a distance that the first electrical connection portion 41 and the power supply terminal 32 can be fixed by solder or be snapped. The specific size of the first preset range is not limited herein. In specific implementation, the distance between the first electrical connection portion 41 and the power supply terminal 32 can be zero, so that the first electrical connection portion 41 is in contact with the power supply terminal 32, and then the first electrical connection portion 41 and the power supply terminal 32 are fixed and electrically connected by solder, or as shown in FIG. 12, each first electrical connection portion 41 includes a clamping spring 411, which is in a snap-fit connection with the power supply terminal 32.

Specifically, the motor 30 includes a positive power supply terminal and a negative power supply terminal, and the output shaft 31 of the motor 30 is rotated by energizing the positive power supply terminal and the negative power supply terminal. Correspondingly, as shown in FIG. 12, two conductive members 40 are provided, one conductive member 40 is electrically connected with the positive power supply terminal, and the other conductive member 40 is electrically connected with the negative power supply terminal, so as to realize the stable transmission of electrical signals.

Referring to FIG. 11, in order to prevent the bending or deformation of the first electrical connection portion 41 and the second electrical connection portion 42 in the conductive member 40 during the assembly of the motor, in some embodiments, the first housing 11 further includes a protruding structure, which extends from the bottom wall 111 toward the accommodating cavity 101, and part of the first electrical connection portion 41 and/or part of the second electrical connection 42 is buried in the protruding structure, so as to better secure and protect the first electrical connection portion 41 and/or the second electrical connection portion 42.

In order to realize mutual insulation between two conductive members 40, when at least part of the conductive member 40 is buried in the bottom wall 111 of the first housing 11, for example, the bottom wall 111 can be arranged to be made of plastic, and the at least part of the conductive member 40 is buried in the bottom wall 111 by injection molding, and the two conductive members 40 are spaced apart at a predetermined distance. At this time, the two adjacent conductive members 40 are spaced apart by the bottom wall 111 to achieve mutual insulation.

Referring to FIG. 9 and FIG. 12 to FIG. 14, in some embodiments, the first-stage worm 21 includes a mounting passage 212 which extends through the first-stage worm 21 axially, the output shaft 31 of the motor 30 penetrates through the mounting passage 212 and protrudes from the mounting passage 212, and the output shaft 31 protruding from the mounting passage 212 can be supported by a supporting structure, so that the motor 30 can be supported stably during rotation, thus reducing the noise of the motor 30 during rotation.

Figure 14:
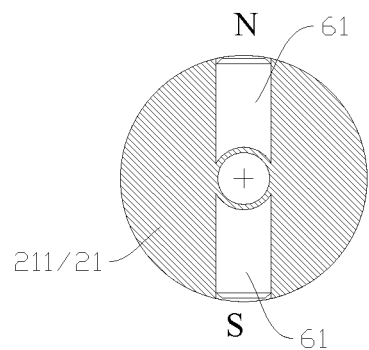
FIG. 14 is a schematic view showing an assembly structure of the first-stage worm and a magnetic element according to the embodiment of the present application.

The drive device 1000 further includes at least two magnetic elements 61 and a Hall element 62, the Hall element 62 is arranged close to the at least two magnetic elements 61, and the at least two magnetic elements 61 are located on an outer circumferential side of the output shaft 31. The first-stage worm 21 further includes a third cylindrical portion 213, the third cylindrical portion 213 is located between the first toothed portion 211 and the motor 30, the third cylindrical portion 213 has at least two first hole passages 214, the at least two first hole passages 214 are uniformly distributed along a circumferential direction of the third cylindrical portion 213 and extend along a radial direction of the third cylindrical portion 213, and at least part of each magnetic element 61 is located in the corresponding first hole passage 214. The first hole passage 241 may be a blind hole, which is convenient to limit the mounting position of the magnetic element 61 and prevent the magnetic element 61 from damaging the output shaft 31 of the motor 30 during mounting. As shown in FIG. 14, the drive device 1000 includes two magnetic elements 61, one of which is a south pole (S pole) and the other one of which is a north pole (N pole). When the output shaft 31 of the motor 30 drives the two magnetic elements 61 to rotate, the N pole and the S pole are alternately close to the Hall element 62, so that the Hall element 62 detects the magnetic change of the magnetic elements 61, and then transmits the detection signal to the control member to obtain the parameter information such as the rotational speed of the motor 30.

Figure 13:
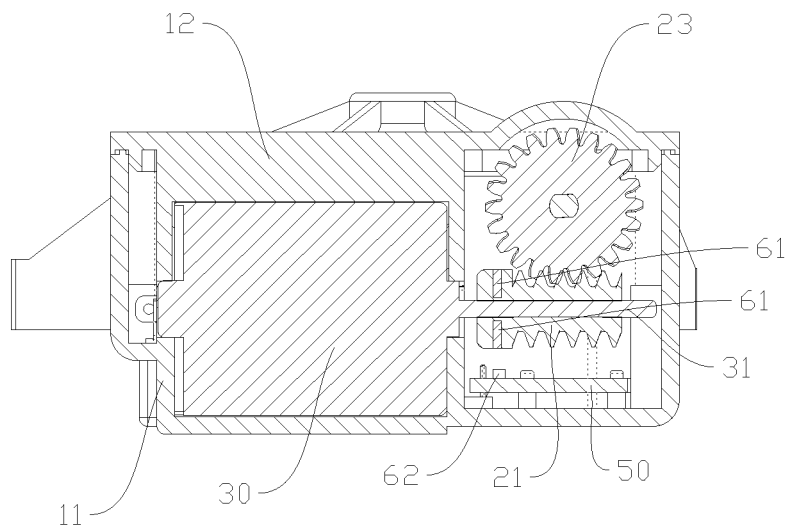
FIG. 13 is another schematic cross-sectional view of the drive device according to the embodiment of the present application.

As shown in FIG. 13, in the specific implementation, the magnetic elements 61 are mounted on the first-stage worm 21, the output shaft 31 of the motor 30 rotates and drives the first-stage worm 21 to rotate when the motor 30 operates, and the magnetic elements 61 rotate with the first-stage worm 21. The Hall element 62 interacts with the magnetic elements 61. The Hall element 62 may be a Hall sensor, a position sensor or other position detector. The feedback signal of the Hall sensor is a Hall signal, and the feedback signal of the position sensor is a Hall signal. The Hall sensor is taken as an example for description. When the output shaft 31 drives the first-stage worm 21 to rotate, and the magnetic elements 61 rotate with the first stage worm 21, the magnetic elements 61 periodically pass through the Hall sensor, and the Hall sensor may generate a periodic feedback signal, that is, the feedback signal changes from low level to high level or from low level to high level. When the stepping motor operates for one circle, the magnetic elements 61 rotate for one circle. The control member collects the above feedback signal and determines the operating state of the motor 30 based on the state of the feedback signal. The operating state of the motor 30 at least includes the normal operating state of the motor 30 and the locked state of the motor 30. A distance is defined between the Hall element 62 and an outer circumferential side of the magnetic elements 61, which prevents the magnetic elements 61 from interfering with the Hall element 62 and damaging the Hall element 62 during the rotation of the magnetic elements 61 with the output shaft 31 of the motor 30.

In some embodiments, in a case that the drive device 1000 further includes the magnetic element 61, at least part of the magnetic element 61 is embedded into the first-stage worm 21. For example, as shown in FIG. 9 and FIGS. 15 to 17, the first-stage worm 21 has a first hole passage 214, and at least part of the magnetic element 61 is located in the first hole passage 214. The first-stage worm 21 is made of plastic, the magnetic element 16, the first-stage worm 21 and the output shaft 31 of the motor 30 form an integral structure by injection molding. With the above arrangement, the magnetic element 61, the first-stage worm 21 and the output shaft 31 of the motor 30 can be firmly connected, so as to prevent the magnetic element 16 from falling off. Compared with press-fitting the magnetic element 16 into the first hole passage 214, the drive device 1000 according to the embodiment of the present application can reduce the damage of the magnetic element 16. In addition, the first-stage worm 21 and the output shaft 31 of the motor 30 can also be fixedly arranged by injection molding, so that the concentricity of the first-stage worm 21 and the output shaft 31 of the motor 30 is improved, and the relatively large lateral force generated by the first-stage worm 21 during rotation is reduced, thereby improving the transmission efficiency of the first-stage worm 21.

Figure 15:
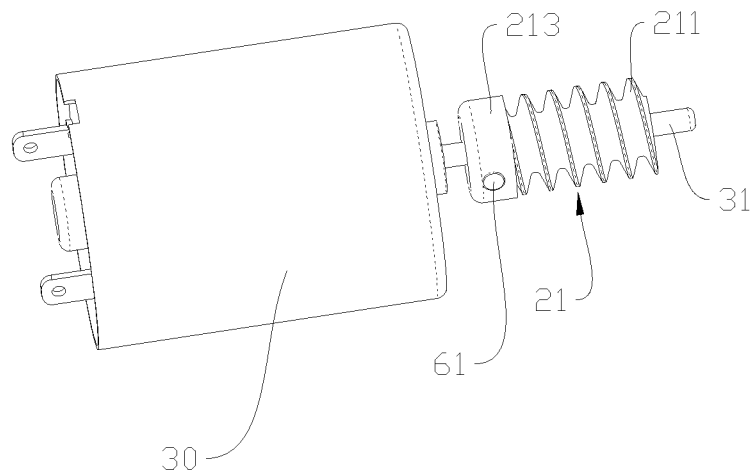
FIG. 15 is a schematic view showing an integral structure of a motor, the first-stage worm and the magnetic element according to the embodiment of the present application.
Figure 16:
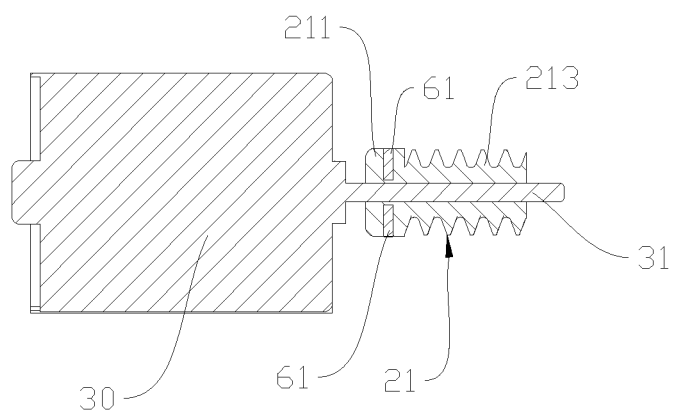
FIG. 16 is a schematic cross-sectional view of the integral structure of the motor, the first-stage worm and the magnetic element shown in FIG. 15.
Figure 17:
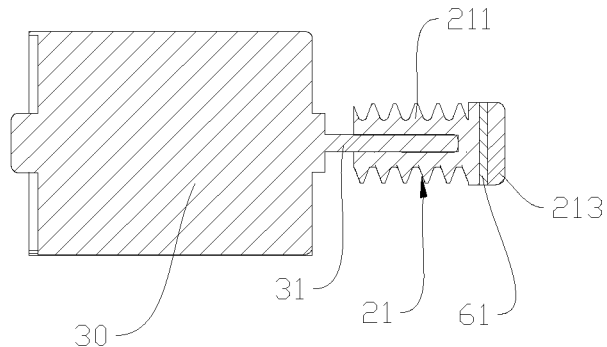
FIG. 17 is a schematic view showing the integral structure of the motor, the first-stage worm and the magnetic element according to another embodiment of the present application.
Figure 18:
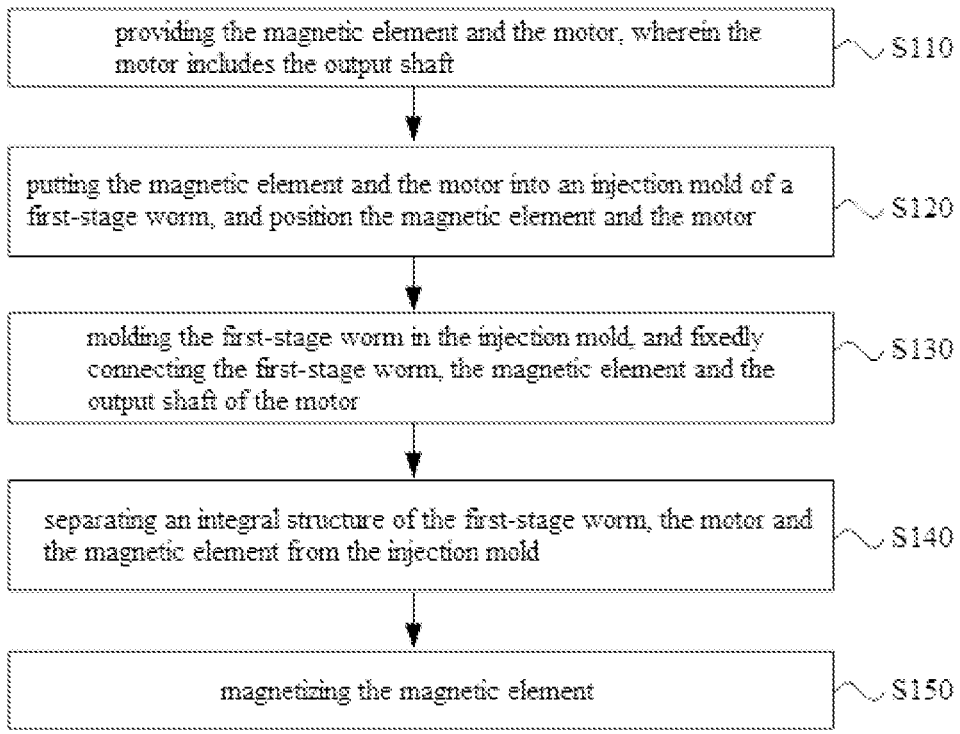
FIG. 18 is a flowchart of a method for manufacturing an integral structure of a motor, a first-stage worm and a magnetic element according to an embodiment of the present application.

As shown in FIG. 15 and FIG. 16, two magnetic elements 61 may be provided, and the two magnetic elements 61 have cylindrical structures. One magnetic element is the south pole (S pole) and the other magnetic element is the north pole (N pole). The two magnetic elements 61 are located on the outer circumferential side of the output shaft 31 and are uniformly arranged along the circumferential direction of the output shaft 31. The magnetic elements 61 extend along the radial direction of the output shaft 31. In some embodiments, as shown in FIG. 17, one magnetic element 61 may be provided, and the magnetic element 61 has a cylindrical structure, one axial end of the magnetic element 61 is the south pole, and the other axial end of the magnetic element 61 is the north pole. Alternatively, the magnetic element may have an annular structure, an axial end of the first-stage worm 21 has an annular groove, and part of the magnetic element is sleeved in the annular groove and is fixed to the first-stage worm 21 by injection molding.

A method for manufacturing a drive device is further provided according to an embodiment of the present application, which includes the method for injecting the output shaft 31 of the motor 30, the first-stage worm 21 and the magnetic element 61 into an integral structure, as shown in FIG. 15 to FIG. 18, and the method includes the following steps:

S110, providing the magnetic element 61 and the motor 30, where the motor 30 includes the output shaft 31.

S120, putting the magnetic element 61 and the output shaft 31 of the motor 30 into an injection mold of the first-stage worm 21, and positioning the magnetic element 61 and the motor 30.

S130, molding the first-stage worm 21 in the injection mold, and fixedly connecting the first-stage worm 21, the magnetic element 61 and the output shaft 31 of the motor 30.

In this embodiment, the plastic material for manufacturing the first-stage worm 21 is filled into the injection mold, and the first-stage worm 21 is molded by injection molding. The molded first-stage worm 21 includes the first toothed portion 211 and the third cylindrical portion 213. The magnetic element 61 and the output shaft 31 of the motor 30 are firmly connected with the first-stage worm 21 by injection molding during the molding of the first-stage worm 21, and part of the magnetic element 61 is embedded into the third cylindrical portion 213. An axial direction of the magnetic element 61 is perpendicular to an axial direction of the third cylindrical portion 213, and at least part of the output shaft 31 of the motor 30 is inserted in the first-stage worm 21 and is coaxially arranged with the first-stage worm 21.

S140, separating the integral structure of the first-stage worm 21, the motor 30 and the magnetic element 61 from the injection mold.

Specifically, since the molded first-stage worm 21 has the first toothed portion 211, when the integral structure is taken out of the injection mold, the motor 30 can be energized to start, and the integral structure is screwed out of the injection mold by the rotation of the output shaft 31 of the motor 30.

S150, magnetizing the magnetic element 61.

In step S130, when the first-stage worm 21 is molded in the injection mold, a high-temperature environment may exist in the injection mold. In order to avoid the influence of the high-temperature environment on the magnetism of the magnetic element 61, according to an embodiment of the present application, the magnetic element 61 is magnetized after the integral structure of the first-stage worm 21, the motor 30 and the magnetic element 61 is separated from the injection mold, so as to improve the magnetism of the magnetic element 61 in the drive device 1000. The magnetized magnetic element 61 has a south pole and a north pole, so that the magnetic element 61 and the Hall element 62 cooperate with each other, and the Hall element 62 can accurately detect the magnetic change of the magnetic element 61, so as to improve the accuracy of detecting parameter information such as the rotational speed of the motor 30.

In the specific implementation, as shown in FIG. 16, when the magnetic elements 61 have cylindrical structures and two magnetic elements 61 are provided, one of the magnetic elements 61 can be magnetized to be the south pole, and the other magnetic element 61 can be magnetized to be the north pole. As shown in FIG. 17, when the magnetic element has a cylindrical structure and one magnetic element is provided, one axial end of the magnetic element is magnetized to be the south pole, and the other axial end is magnetized to be the north pole.

In order to realize the output transmission torque of the drive device 1000, referring to FIG. 1, in some embodiments, the transmission assembly further includes an output gear 24, the output shaft 24 and the second toothed portion 221 of the second-stage worm 22 form a transmission mesh structure, and the output gear 24 is made of plastic.

In summary, in the drive device according to the embodiment of the present application, the transmission assembly of the drive device 1000 includes the first-stage worm 21 and the second-stage worm 22, the first-stage worm 21 is in transmission connection with the output shaft 31 of the motor 30, and the second-stage worm 22 is in transmission connection with the first-stage worm 21. Compared with only providing one stage worm, in a case that the transmission assembly achieves the same output torque and has the same transmission ratio, the output gear of the transmission assembly has a smaller size by providing two stage worm drive according to the embodiment of the present application, so that the structure of the drive device 1000 is compact. Further, the first housing 11 of the drive device 1000 includes the first protruding portion 112 and the second protruding portion 113, the first protruding portion 112 and the second protruding portion 113 are arranged on two sides of the second toothed portion 221 of the second-stage worm 22, so as to support and limit the second-stage worm 22. The second housing 12 includes the third protruding portion 122, the third protruding portion 122 is arranged close to the transmission gear 23, and the distance between the third protruding portion 122 and the transmission gear 23 is within the preset range, which can limit the movement along the radial direction of the worm caused by the meshing operation of the transmission gear 23 and the first-stage worm 21, so that the drive device can stably drive the valve core of the control valve to rotate and improve the drive performance of the drive device 1000.

In another aspect, a control valve is further provided according to an embodiment of the present application, which includes a valve core and the drive device 1000 according to any one of above embodiments, the transmission assembly of the drive device 1000 further includes an output gear 24, the valve core includes an input shaft section, and the input shaft section is in a transmission cooperation with the output gear 24, so that the input shaft section and the output gear 24 rotate synchronously. In an embodiment, an output shaft of the output gear 24 may include a square shaft hole, and an outer surface of the input shaft section of the valve core is a square shaft section that fits the square shaft hole. The square shaft section is inserted in the square shaft hole, so as to realize the rotation of the valve core driven by the output gear 24. Alternatively, an output shaft of the output gear 24 may include a square shaft section, and the input shaft section of the valve core may include a square shaft hole. The square shaft section is inserted in the square shaft hole, so as to realize the rotation of the valve core driven by the output gear 24. The control valve according to the present application has the same beneficial effects as the above drive valve 1000, which is not described in detail herein.

The above embodiments are only used to illustrate the present application rather than limit the technical solutions described in the present application. Although the present application is described in detail in this specification with reference to the above embodiments, those of ordinary skill in the art should understand that those skilled in the art may still modify or equivalently replace the present application, and all technical solutions and improvements thereof that do not depart from the spirit and scope of the present application shall be covered within the scope of the claims of the present application.

What is claimed is:

1. A drive device, comprising a housing, a motor and a transmission assembly, wherein an accommodating cavity is defined in the housing, the motor and at least part of the transmission assembly are located in the accommodating cavity, the housing comprises a first housing and a second housing, the first housing comprises a bottom wall, the second housing comprises a top wall, the bottom wall and the top wall are arranged oppositely, the transmission assembly comprises a first-stage worm, a second-stage worm and a transmission gear, the first-stage worm is in a transmission connection with an output shaft of the motor, the second-stage worm is in a transmission connection with the first-stage worm through the transmission gear, and an orthographic projection of an axis of the first-stage worm on the bottom wall intersects with an orthographic projection of an axis of the second-stage worm on the bottom wall;

wherein the first-stage worm comprises a first toothed portion, the second-stage worm comprises a second toothed portion, the first toothed portion and the transmission gear form a transmission mesh structure, and the second toothed portion is located on one side, away from the first toothed portion, of the second-stage worm;

wherein the first housing further comprises a first protruding portion and a second protruding portion, the first protruding portion and the second protruding portion are fixedly connected with the bottom wall and are located in the accommodating cavity, the first protruding portion and the second protruding portion are in a position-limiting cooperation with the second-stage worm; along an axial direction of the second toothed portion, the first protruding portion is located on one side of the second toothed portion, and the second protruding portion is located on another side of the second toothed portion;

wherein the second housing further comprises a third protruding portion, the third protruding portion extends from the top wall toward the accommodating cavity; along an axial direction of the second-stage worm, the third protruding portion is arranged close to the transmission gear, and a distance between the third protruding portion and the transmission gear is within a preset range.

2. The drive device according to claim 1, wherein the drive device comprises at least three mounting portions which are located on an outer circumferential side of the housing, the at least three mounting portions and the housing are integrally formed, an area of a rectangular region defined by the at least three mounting portions and an outer surface of the housing is less than or equal to 9230 square millimeters, a transmission ratio of the transmission assembly is greater than or equal to 620 and less than or equal to 700, and an output torque of the transmission assembly ranges from 3 N·m to 7 N·m.

3. The drive device according to claim 2, wherein the at least three mounting portions comprise a first mounting portion, a second mounting portion and a third mounting portion, the first mounting portion and the second mounting portion are located on two radial sides of the second-stage worm, the third mounting portion is located on one side, away from the first-stage worm, of the second-stage worm, the housing comprises a first side wall, and the first-stage worm and the second-stage worm are located between the first side wall and the third mounting portion along the axial direction of the second-stage worm, a center distance between a mounting hole of the first mounting portion and a mounting hole of the second mounting portion is less than 79 mm along a radial direction of the second-stage worm, and a distance between a mounting hole of the third mounting portion and an outer surface of the first side wall is less than 117 mm along the axial direction of the second-stage worm.

4. The drive device according to claim 2, wherein the second-stage worm comprises a first cylindrical portion and a second cylindrical portion, the second toothed portion is located between the first cylindrical portion and the second cylindrical portion, and at least part of the second cylindrical portion is located between the second toothed portion and the transmission gear, the first protruding portion comprises a first groove portion, the second protruding portion comprises a second groove portion, the third protruding portion comprises a third groove portion, at least part of the first cylindrical portion is located in a groove cavity of the first groove portion, and the first cylindrical portion is in a clearance fit with the first groove portion; the second cylindrical portion comprises a first sub-portion and a second sub-portion which are arranged axially, the first sub-portion is located between the second toothed portion and the second sub-portion, at least part of the first sub-portion is located in a groove cavity of the second groove portion, and the first sub-portion is in a clearance fit with the second groove portion; at least part of the second sub-portion is located in a groove portion of the third groove portion, and the second sub-portion is in a clearance fit with the third groove portion.

5. The drive device according to claim 2 wherein an axial length of second-stage worm is larger than an axial length of the first-stage worm, the axial length of the second-stage worm is greater than or equal to 550 mm and less than or equal to 650 mm, and the strength of the second-stage worm is larger than the strength of the first-stage worm, the first-stage worm is made of plastic, and the second-stage worm is made of metal.

6. The drive device according to claim 2, wherein the first-stage worm comprises a mounting passage which extends through the first-stage worm axially, the output shaft of the motor penetrates through the mounting passage;

the drive device further comprises at least two magnetic elements and a Hall element, the Hall element is arranged close to the at least two magnetic elements, the at least two magnetic elements are located on an outer circumferential side of the output shaft, the first-stage worm further comprises a third cylindrical portion, the third cylindrical portion is located between the first toothed portion and the motor, the third cylindrical portion has at least two first hole passages, the at least two first hole passages are uniformly distributed along a circumferential direction of the third cylindrical portion and extend along a radial direction of the third cylindrical portion, and at least part of each magnetic element is located in the corresponding first hole passage.

7. The drive device according to claim 1, wherein the second-stage worm comprises a first cylindrical portion and a second cylindrical portion, the second toothed portion is located between the first cylindrical portion and the second cylindrical portion, and at least part of the second cylindrical portion is located between the second toothed portion and the transmission gear, the first protruding portion comprises a first groove portion, the second protruding portion comprises a second groove portion, the third protruding portion comprises a third groove portion, at least part of the first cylindrical portion is located in a groove cavity of the first groove portion, and the first cylindrical portion is in a clearance fit with the first groove portion; the second cylindrical portion comprises a first sub-portion and a second sub-portion which are arranged axially, the first sub-portion is located between the second toothed portion and the second sub-portion, at least part of the first sub-portion is located in a groove cavity of the second groove portion, and the first sub-portion is in a clearance fit with the second groove portion; at least part of the second sub-portion is located in a groove portion of the third groove portion, and the second sub-portion is in a clearance fit with the third groove portion.

8. The drive device according to claim 7, wherein the first groove portion comprises a first abutting portion and a first oil groove, the first cylindrical portion abuts against the first abutting portion, the first oil groove is recessed from part of a wall portion of the first abutting portion, and the first oil groove is located at part of an outer circumferential side of the first cylindrical portion;
and/or, the second groove portion comprises a second abutting portion and a second oil groove, the first sub-portion abuts against the second abutting portion, the second oil groove is recessed from part of a wall portion of the second abutting portion, and the second oil groove is located at part of an outer circumferential side of the first sub-portion;
and/or, the third groove portion comprises a third abutting portion and a third oil groove, the second sub-portion abuts against the third abutting portion, the third oil groove is recessed from part of a wall portion of the third abutting portion, and the third oil groove is located at part of an outer circumferential side of the second sub-portion.

9. The drive device according to claim 8 wherein an axial length of second-stage worm is larger than an axial length of the first-stage worm, the axial length of the second-stage worm is greater than or equal to 550 mm and less than or equal to 650 mm, and the strength of the second-stage worm is larger than the strength of the first-stage worm,
the first-stage worm is made of plastic, and the second-stage worm is made of metal.

10. The drive device according to claim 8, wherein the first-stage worm comprises a mounting passage which extends through the first-stage worm axially, the output shaft of the motor penetrates through the mounting passage;
the drive device further comprises at least two magnetic elements and a Hall element, the Hall element is arranged close to the at least two magnetic elements, the at least two magnetic elements are located on an outer circumferential side of the output shaft, the first-stage worm further comprises a third cylindrical portion, the third cylindrical portion is located between the first toothed portion and the motor, the third cylindrical portion has at least two first hole passages, the at least two first hole passages are uniformly distributed along a circumferential direction of the third cylindrical portion and extend along a radial direction of the third cylindrical portion, and at least part of each magnetic element is located in the corresponding first hole passage.

11. The drive device according to claim 7, wherein the first housing further comprises at least one fourth protruding portion, the fourth protruding portion extends from the bottom wall toward the accommodating cavity, at least part of the fourth protruding portion is located between the second protruding portion and the third protruding portion along the axial direction of the second-stage worm, the fourth protruding portion comprises a fourth groove portion, the fourth groove portion comprises a fourth abutting portion, part of the second cylindrical portion is located in a groove cavity of the fourth groove portion and is in a clearance fit with the fourth groove portion, and the second cylindrical portion abuts against the fourth abutting portion.

12. The drive device according to claim 11, wherein the second housing comprises at least one fifth protruding portion, the fifth protruding portion comprises a fifth groove portion, the fifth groove portion comprises a fifth abutting portion, part of the second-stage worm is located in a groove cavity of the fifth groove portion and abuts against the fifth abutting portion, and the fifth protruding portion is arranged adjacent to at least one of the first protruding portion, the second protruding portion and the fourth protruding portion, to limit the movement of the second-stage worm along a direction perpendicular to the bottom wall.

13. The drive device according to claim 1, wherein an axial length of second-stage worm is larger than an axial length of the first-stage worm, the axial length of the second-stage worm is greater than or equal to 550 mm and less than or equal to 650 mm, and the strength of the second-stage worm is larger than the strength of the first-stage worm,
the first-stage worm is made of plastic, and the second-stage worm is made of metal.

14. The drive device according to claim 1, wherein the drive device further comprises a conductive member, the motor comprises a power supply terminal which is exposed to an outer surface of the motor, the power supply terminal is electrically connected with the conductive member, and at least part of the conductive member is buried in the bottom wall;
the conductive member comprises a first electrical connection portion which is electrically connected with the conducive member, and the first electrical connection portion is a rigid conductive portion;
the power supply terminal is welded to the first electrical connection portion, or the power supply terminal is in a snap-fit connection with the first electrical connection portion.

15. The drive device according to claim 14, wherein the drive device further comprises a control member, the control member comprises a power supply control terminal, and the power supply control terminal is electrically connected with the power supply terminal through the conductive member;
the conductive member comprises a second electrical connection portion which is electrically connected with the first electrical connection portion, and the second electrical connection portion is a rigid conductive portion;
the power supply control terminal is welded to the second electrical connection portion, or the power supply control terminal is in a snap-fit connection with the second electrical connection portion.

16. The drive device according to claim 1, wherein the first-stage worm comprises a mounting passage which extends through the first-stage worm axially, the output shaft of the motor penetrates through the mounting passage;

the drive device further comprises at least two magnetic elements and a Hall element, the Hall element is arranged close to the at least two magnetic elements, the at least two magnetic elements are located on an outer circumferential side of the output shaft, the first-stage worm further comprises a third cylindrical portion, the third cylindrical portion is located between the first toothed portion and the motor, the third cylindrical portion has at least two first hole passages, the at least two first hole passages are uniformly distributed along a circumferential direction of the third cylindrical portion and extend along a radial direction of the third cylindrical portion, and at least part of each magnetic element is located in the corresponding first hole passage.

17. The drive device according to claim 1, wherein the transmission assembly further comprises an output gear, the output gear and the second toothed portion of the second-stage worm form a transmission mesh structure, and the output gear is made of plastic.

18. The drive device according to claim 1, wherein the drive device further comprises a magnetic element, the magnetic element is located on an outer circumferential side of the output shaft and is rotatable synchronously with the output shaft, and part of the magnetic element is embedded into the first-stage worm;

the first-stage worm is made of plastic, and the magnetic element, and the first-stage worm and the output shaft form an integral structure by injection molding.

19. A control valve, comprising a valve core and the drive device according to claim 1, wherein the transmission assembly of the drive device further comprises an output gear, the valve core comprises an input shaft section, and the input shaft section is in a transmission cooperation with the output gear, so that the input shaft section and the output gear rotate synchronously.

20. A method for manufacturing a drive device, wherein the drive device is the drive device according to claim 1, the drive device further comprises a magnetic element, and the method comprises:

providing the magnetic element and the motor, wherein the motor comprises the output shaft;

putting the magnetic element and the output shaft of the motor into an injection mold of the first-stage worm, to inject the output shaft of the motor, the first-stage worm and the magnetic element into an integral structure; and magnetizing the magnetic element.

* * * * *